United States Patent [19]

Balthes

[11] 3,731,475
[45] May 8, 1973

[54] AGRICULTURAL LEAF PICKING MACHINE

[75] Inventor: John Balthes, Port Burwell, Ontario, Canada

[73] Assignee: Balthes Farm Equipment Manufacturing Limited, Tillsonburg, Ontario, Canada

[22] Filed: Nov. 17, 1969

[21] Appl. No.: 877,361

[52] U.S. Cl. ............................... 56/27.5, 130/30 A
[51] Int. Cl. ................................. A01d 45/16
[58] Field of Search ............... 56/13.4, 13.5, DIG. 1; 191/61; 198/33, 27.5

[56] References Cited

UNITED STATES PATENTS

| | | | |
|---|---|---|---|
| 3,466,856 | 9/1969 | Rakestraw | 52/27.5 |
| 3,178,873 | 4/1965 | Meyer | 52/27.5 |
| 3,096,604 | 7/1963 | Baker et al. | 56/13.5 |
| 3,439,793 | 4/1969 | Rakestraw | 198/33 |
| 3,387,612 | 6/1968 | Tillotson | 56/DIG. 1 |

Primary Examiner—Russell R. Kinsey
Assistant Examiner—J. Q. Lever
Attorney—Douglas S. Johnson

[57] ABSTRACT

Tobacco priming machine which is especially adapted for mounting on a self propelled tobacco harvester. The tobacco priming heads operate in pairs so that the tobacco plant enters between a pair of heads; and the heads are tilted with rearward moving spaced knives between the heads so that the relative speed of any one rearward moving knife and the tobacco stalk is zero but so that the knives move upwards on the stalk as the heads move past it. The conveyors are mounted to carry the tobacco leaves to the rear of the machine where an air-blast delays their free fall off the end of the conveyor into a chute sufficiently so that the heavy, butt-end of each leaf turns downward and so that all leaves falling through the chute and into a bin are oriented in the same stem-first direction.

12 Claims, 14 Drawing Figures

Patented May 8, 1973

INVENTOR.
JOHN BALTHES
BY Douglas A. Johnson
Attorney

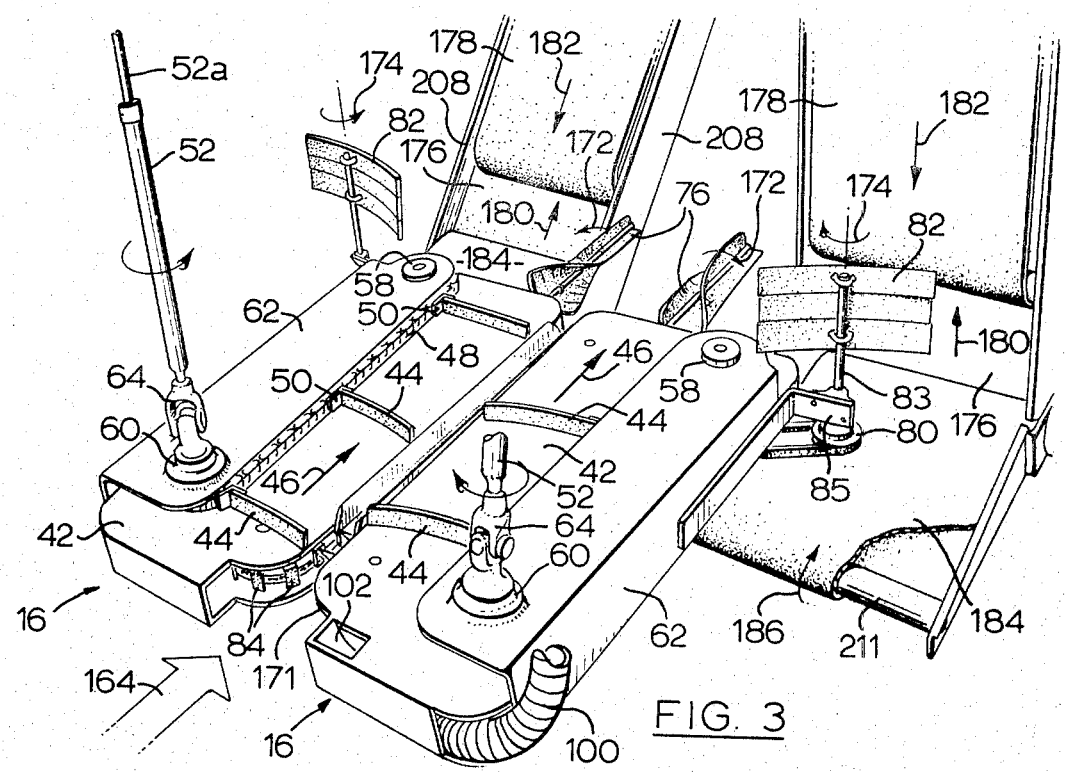
FIG. 3
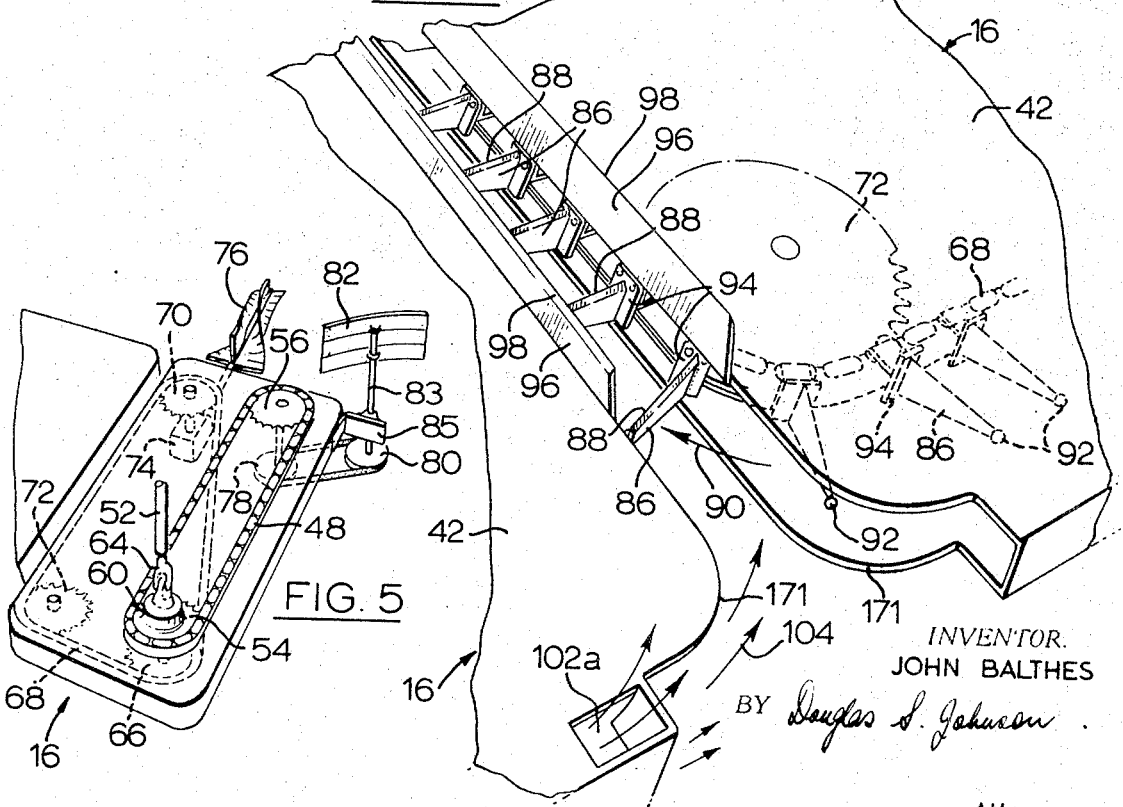
FIG. 4
FIG. 5
INVENTOR.
JOHN BALTHES
BY Douglas S. Johnson
Attorney Patented May 8, 1973

INVENTOR.
JOHN BALTHES

BY Douglas S. Johnson

Attorney

Patented May 8, 1973

INVENTOR.
JOHN BALTHES

BY Douglas S. Johnson

Attorney

Patented May 8, 1973

INVENTOR.
JOHN BALTHES

BY Douglas S. Johnson

Attorney

INVENTOR.
JOHN BALTHES
BY
Douglas S. Johnson
Attorney

INVENTOR.
JOHN BALTHES

INVENTOR.
JOHN BALTHES

AGRICULTURAL LEAF PICKING MACHINE

FIELD OF THE INVENTION

This invention relates to an apparatus for removing leaves from a substantially upright stalk of a plant and delivering them, seriatim, to a receiving bin. More particularly, the invention relates to a machine which is particularly adapted for use as a tobacco priming machine.

Essentially, a tobacco priming machine as contemplated by this invention is one which removes, or primes, leaves from growing tobacco plants, and which conveys and delivers the leaves to bins from which they may be handled for curing and other purposes. The tobacco priming machine contemplated in this invention is one which may be particularly adapted to remove leaves from a tobacco plant at a specific height range measured from the ground in which the plant is growing. That is to say, the tobacco priming machine herein is one which can duplicate the usual priming operations (i.e. tobacco picking or harvesting as it is known in the trade), as will appear more evident hereafter.

The orienting of tobacco leaves is also an important consideration because the leaves are usually flue-cured with the leaves being sewn in "hands" onto sticks so as to accommodate the placing of the tobacco leaves into the curing houses. In order to facilitate the sewing of the leaves onto the sticks, which process is usually carried out at a central location near the tobacco curing houses, it is necessary to deliver the individual tobacco leaves to the apparatus which will sew them to the sticks so that the leaves are properly oriented; e.g., so that they may be delivered butt-end first over the stick.

DESCRIPTION OF THE PRIOR ART

In general, tobacco plants ripen from the bottom up so that it is very often necessary to make several passes through a field of tobacco at spaced intervals of time so as to pick or "prime" all of the leaves from the tobacco plants as they come to the correct degree of ripeness for priming. Several different approaches have been taken, including the approach to cut the tobacco stalks so that all of the tobacco ceases its growing at the same time. Examples of machines of the sort which cut the tobacco plants at or near ground level include U.S. Pats. No. 3,079,744 issued Mar. 5, 1963 to Newswanger, No. 3,178,873 issued Apr. 20, 1965 to Meyer, and No. 2,836,950 issued June 3, 1958 to Anderson. Another approach whereby all of the tobacco leaves are removed from the plant at the same time is shown in Cox, U.S. Pat. No. 2,635,408 issued Apr. 21, 1953.

Other attempts have been made to provide machines which prime tobacco in a progressive manner; and they include Wilson, U.S. Pat. Nos. 2,816,411, 2,834,173 and 3,083,517 issued Dec. 17, 1957, May 13, 1958 and Apr. 2, 1963 respectively, and Hawkins, U.S. Pat. No. 2,696,069 issued Dec. 7, 1954. These patents employ a beating, wiping or stroking action so as to defoliate or partially defoliate the tobacco stalk, but all of the machines taught in these patents have tended to injure or break the tobacco leaves so as to make them either useless (such as wrappers) or in any event of lower quality when the leaves are later cured and offered for sale.

Tobacco leaf handling equipment has also been known in the past, which equipment has been expensive and has very often caused injury to the leaf even when the leaf has been hand primed and placed into the leaf conveying equipment in good condition. An example of the prior art in agricultural produce conveying equipment is U.S. Pat. No. 3,268,057 issued Aug. 23, 1966 to Ross et al., but that patent is particularly concerned with the orienting and conveying of ears of corn. U.S. Pat. No. 2,618,373 issued to Hathaway dated Nov. 18, 1952 shows a pneumatic system for arranging tobacco leaves on a belt with the leaf stems headed in one direction, but the machine taught in that patent apparently tended to cause damage to the leaves as it was operating.

SUMMARY OF THE INVENTION

It is an object of this invention to provide a tobacco priming apparatus which can be adjusted to remove leaves from individual growing tobacco plants at a predetermined height measured from the ground without causing damage to the device or to the plant; and further to provide leaf orientation and conveying apparatus to deliver the picked tobacco leaves to bins with a constant orientation so that the leaves may be later removed from the bins having that orientation.

It is a further object of this invention to provide an automatic tobacco priming machine which may operate in the tobacco growing fields at differing rates as may be chosen by the operator to suit the conditions at the time at which the machine is operating.

A still further object of this invention is to provide automatic tobacco priming apparatus which may be operated by as few as one operator, and which may be adapted to prime more than a single row of tobacco at one time.

BRIEF DESCRIPTION OF THE DRAWING

These and other features and objects of the invention will become more evident hereafter in the following description taken in association with the drawings in which:

FIG. 3 is a perspective view showing the leaf priming and the leaf orienting apparatus, and the lower end of the leaf conveying apparatus;

FIG. 4 is a perspective detailed view of a preferred embodiment of the moving knife arrangement of the leaf priming apparatus;

FIG. 5 is a perspective view showing the drive arrangement within one of the leaf priming and leaf orienting heads;

DESCRIPTION OF THE PREFERRED EMBODIMENT

The automatic tobacco priming machine of this invention is shown generally at 10. The leaf conveying apparatus shown generally at 12, the leaf delivery apparatus shown generally at 14, the leaf priming apparatus (priming heads) shown generally at 16, the leaf orienting apparatus, and the bins 18 may all conveniently be mounted on a tobacco harvesting machine which may, or may not, be adapted for that purpose. Conveniently, and in the accompanying illustrations, the tobacco priming equipment which includes the priming heads 16 and the conveyors 12, delivery apparatus 14, orienting apparatus, and bins 18, may be mounted on a tobacco harvesting machine such as that shown in Balthes, Canadian Patent 730,384 issued Mar. 22, 1966 and U.S. Pat. No. 3,217,823 issued Nov. 16, 1965. Of course, the invention and the discussion and illustrations relating thereto are not in any way limited to the tobacco harvester referred to; and as indicated, the tobacco priming apparatus and the associated apparatus may be mounted on any suitable machine for that purpose.

Figure 1:
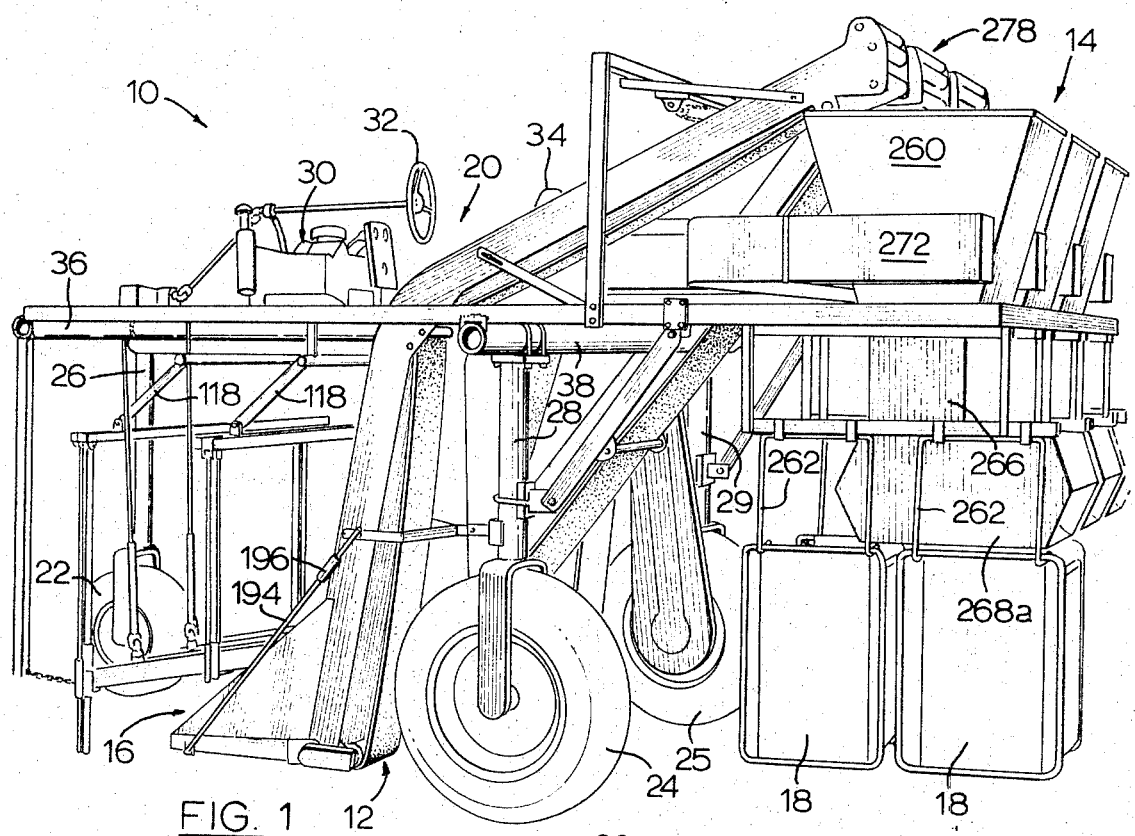
FIG. 1 is a rear three-quarter view of a tobacco harvesting machine showing the tobacco priming apparatus and the tobacco leaf conveying and delivery apparatus and the tobacco bins attached thereto.
Figure 2:
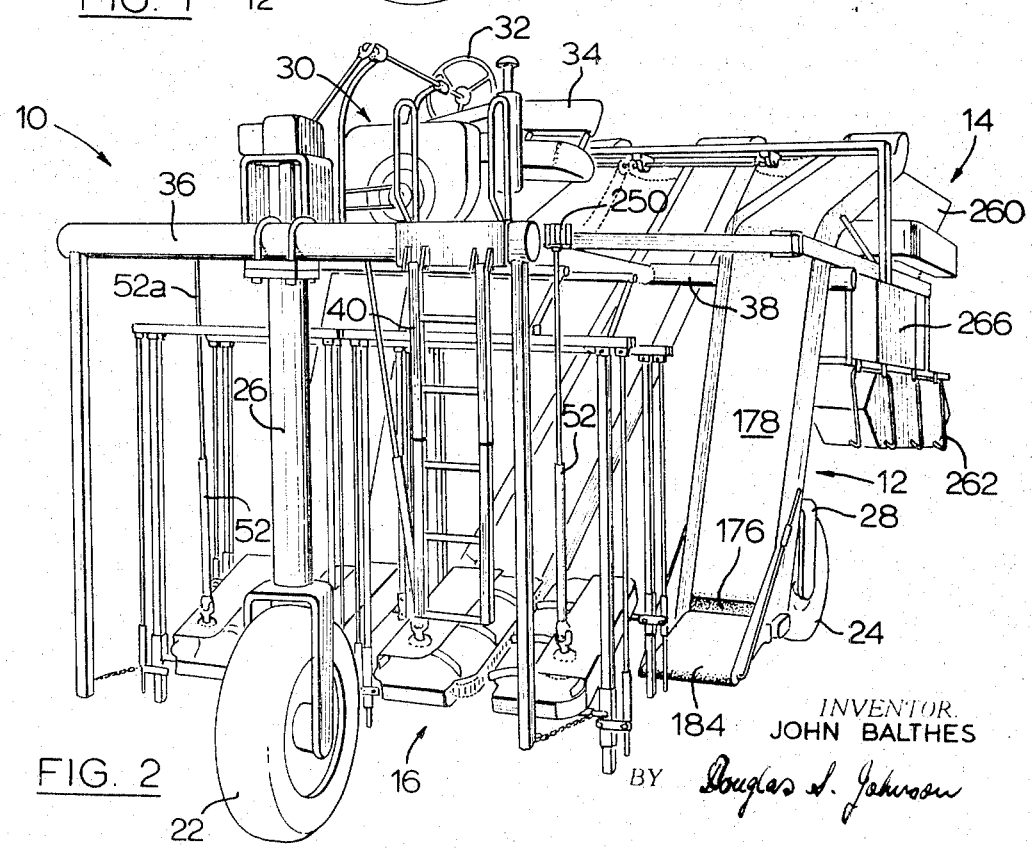
FIG. 2 is a front three-quarter view of the tobacco harvesting machine of FIG. 1 showing the tobacco priming apparatus and the tobacco leaf conveying and delivery apparatus attached thereto.

Referring briefly to FIGS. 1 and 2 from which overall impressions of the present invention may be derived, having in mind the above comments, there is shown a tobacco harvester machine 20 having a front, steerable wheel 22 and rear, driven wheels 24 and 25. The wheels 22, 24 and 25 are supported at the bottom of frame members 26, 28 and 29, none of the details of which is relevant to the present invention. An engine 30 is mounted on a frame over the tobacco harvester machine 20, and conveniently a steering position having steering wheel 32 and operator seat 34, may also be installed at the top of the tobacco harvester machine 20. Horizontal frame members 36 and 38 extend across the width of the machine at the front and rear thereof. A ladder 40 may conveniently be installed, such as illustrated in FIG. 2, so as to assist the operator in mounting to the top of the tobacco harvester 20 when necessary.

The general purpose of the tobacco priming machine according to this invention is to prime leaves at a predetermined height from the ground from tobacco plants which grow in rows; irrespective of the speed at which the tobacco harvester machine, on which the tobacco priming apparatus is mounted advances along the rows of tobacco plants. When the leaves are primed from the tobacco plant, the tobacco priming apparatus of the present invention provides leaf orienting, conveying and delivery apparatus which removes each individual leaf from the priming head as it is primed, and delivers the leaves seriatim to tobacco bins which are conveniently mounted at the rear of the tobacco harvester machine. The leaf orienting, conveying and delivery apparatus operates in association with the tobacco priming heads per se to provide a complete tobacco priming machine having all of the functions described above, and which may therefore be operated with very considerable manpower savings.

It is convenient to refer to various parts of the tobacco priming machine of this invention by reference to their function; i.e. tobacco leaf priming, leaf orienting, leaf conveying and leaf delivery apparatus as well as tobacco leaf receiving bins. However, reference to any specific portion of the tobacco priming machine of this invention, using such terms, is not intended to limit the generality of this discussion as it relates to the tobacco priming machine; but rather, such references as may be made to the specific portions of the tobacco priming machine are made so as to assist in the description of any of those portions, and in the discussion of their function and relationship to the entire tobacco priming machine contemplated herein.

Referring to FIGS. 3, 4 and 5, there is shown in each Figure at least a portion of two tobacco priming heads 16 which co-operate in pairs, as will be explained more fully hereafter. There is also shown the leaf orienting apparatus and the lower end of the leaf conveying apparatus, as will also be discussed in greater detail hereafter. The priming heads are each generally referred to at 16, and each has an upper surface or table 42. A set of flexible, finger-like paddles, each of which is indicated at 44, is adapted to sweep backwardly on the inner portion of each of the tables 42 in the pair of tables (particularly as shown in FIG. 3), in the manner indicated at arrows 46. Each of the flexible, finger-like paddles 44 may be made of a web reinforced rubber-like material, or other suitable flexible material, and each is attached to a chain 48 with brackets 50, or otherwise as may be suitable. In any event, it is obvious from FIGS. 3 and 5 that driving rods 52, each turning in the direction indicated in FIG. 3, drive pinions 54 about which chains 48 are wrapped so that the chains may in turn drive the paddles 44 in the manner indicated at arrows 46. Each chain is conveniently wrapped around tail-gear 56 held in bearings 58. The bearings 58, and bearings 60 holding pinions 54 and the driving rods 52, are mounted in a shield 62 which overlies the outer portion of each of the tables 42 so that only the backward moving finger-like paddles 44 attached to chains 48 are exposed. The drive rods 52 are conveniently drivingly attached to pinions 54 through universals 64.

Below the tables 42, and within each of the heads 16, there is mounted a further pinion 66. Conveniently, pinion 66 is mounted on a shaft which is an extension downwardly from pinion 54. As shown particularly in FIG. 5, a chain 68 may conveniently be wrapped around pinion 66 and chain gears 70 and 72. A gear box 74 may conveniently be mounted below gear 70 to impart rotating motion to an augur-type paddle 76 in a manner to be described in greater detail hereafter; and in like manner, a pulley 78 may be mounted below chain gear 56 to drive pulley 80 and fan-type paddle 82, also as discussed in greater detail hereafter. The shaft 83 of fan-type paddle 82 is held in a bearing mounted on bracket 85, which is securely fastened to the outer edge of each of the priming heads 16.

In each of FIGS. 3 and 4 there is shown a plurality of pads 84 and a plurality of knives 86, having knife edges 88, attached to the chains 68 in the (machine) right- and left- handed heads respectively. (The right-hand head being the left one as viewed in the drawing.) Obviously, the pads 84 and the knives 86 are adapted to be driven by each respective chain 68 backwards in the same direction as indicated at arrows 46 and by arrow 90 in FIG. 4. Each of the pads 84 is conveniently made of a flexible or easily compressed material, preferably having a slight abrasiveness. Each of the knives 86 is arranged having knife edges 88 which are substantially horizontally disposed having regard to the machine; and tips 92 may be mounted at the end of each of the knives 86 so as to blunt the ends thereof. The knives 86 are conveniently mounted to the chain 68 by brackets 94, as are the pads 84.

FIGS. 3 and 4 show the pads 84 in the right-hand head and the knives 86 in the left-hand head. However, as will appear hereafter during the discussion of the operation of the heads 16, the pads 84 and the knives 86 may be mounted on the other of the heads respectively, or they may alternately be mounted within each of the heads. However, it is convenient to mount all of the knives 86 within one of the heads 16 for such purposes as ease of assembly, replacement, cleaning, maintenance, etc.; and the mounting of all knives on one of the chains precludes any clashing or interference between knives in the event that the chains on the left- and right-hand heads of a pair become unsynchronized with respect to the machine driving speed.

A pair of knives 96 are mounted, one on each of the heads, so that the knives 96 extend at least partially along the inner edge of each of the heads 16 adjacent the space between them. A knife edge 98 is disposed along the upper edge of each of the knives 96. An air duct 100 having vent 102 is shown in the left-hand head in FIG. 3, and vent 102a is shown in the right-hand head in FIG. 4. In the usual case, the air-duct and vent are installed in only one of the heads of a pair, and the drawings show that it may be either of the heads. An air blast indicated at arrows 104 eminates from the vent 102 or 102a when pressurized air is fed through air duct 100, as is discussed hereafter.

Figure 6:
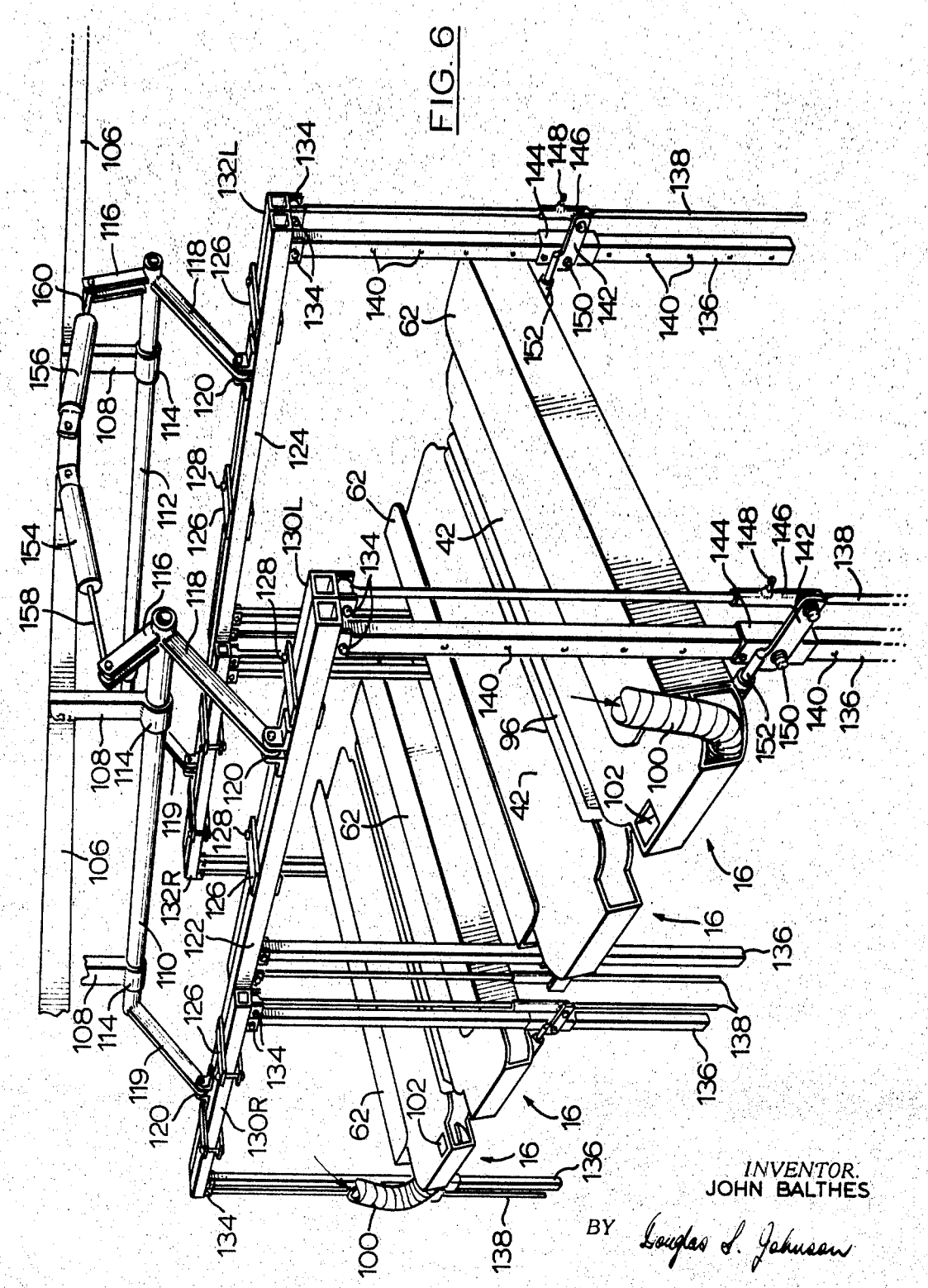
FIG. 6 is a perspective view showing the swinging, tilting and elevating features of the leaf priming apparatus.

FIG. 6 shows the swinging, tilting and elevating features of the leaf priming heads 16. The entire assemblies are supported from suitable frame members 106 of the tobacco harvester machine 20 by supports 108 carrying front and rear horizontally disposed supporting members 110 and 112 respectively. The support members 110 and 112 are locatable within bearings 114 at the lower ends of the supports 108. Fixed at one end of each of the members 110 and 112 are sets of arms 116 and 118 which are, in the embodiment illustrated, the shorter and longer arms respectively of the tilting arrangement for the heads 16 as discussed hereafter. At the other end of support members 110 and 112, arms 119 are fixed so as to duplicate the supporting and swinging functions of arms 118.

The lower ends of the arms 118 and 119 are swingably attached at hinge members 120 to further front and rear supports 122 and 124 respectively. Attached to the supports 122 and 124 are brackets 126 which are closable by such means as bolts 128; and right and left extension support members 130L and 130R and 132L and 132R are respectively secured to supports 122 and 124 by the brackets 126. Swingably suspended below all of the supports 122, 124, 130 and 132 at pivots 134 are a series of vertical hangers 136 and 138. The hangers 136 are conveniently of a rectilinear cross-section and have a series of holes 140 at spaced vertical intervals extending at least through one face thereof. The hangers 138 are swingably suspended beneath the extension supports in each instance, and may be linked by link arm 142 to the hangers 136. The link arms 142 may be secured to the sleeves 144 on hangers 136 and sleeves 146 on hangers 138. The sleeves 146 may be secured to hangers 138 by a knurled thumb screw 148, or otherwise as may be convenient. The sleeves 144 may be secured to hangers 136 by bolts 150 which extend through each respective sleeve and into one of the holes 140 in the respective hanger 136. It will also be noted that each of sleeves 144 provides a lateral support 152 which extends beneath the front or rear of each of the respective heads 16 with which each is associated. Thus, the heads 16 are vertically supported by supports 152 secure to sleeves 144 and to hangers 136. Each of the heads 16 is independently swingable in a lateral direction because of the swingable engagement of each of the hangers at pivots 134.

It will be noted, of course, that the height of each of the front and rear ends of each of the heads 16 can be readily adjusted, simply by moving the respective sleeves up or down on the hangers as required. Because of the spacings of the holes 140 in hangers 136, the limit of the adjustment of the height of the front or rear of any one of the heads is governed by one half of the spaced interval between any two adjacent holes 140 in any of the hangers 136. However, finer, or more accurate, adjustment to a specific pre-determined height of the heads 16 may be accomplished through the operation of either of the hydraulic cylinders 154 or 156 which are associated with front and rear support members 110 and 112 respectively. As can be clearly seen from FIG. 6, the operation of hydraulic cylinders 154 and 156 to extend the piston rod 158 or 160 from each, respectively, would have the effect of lowering the front ends of the heads 16 and raising the rear ends of the heads. Obviously, the range of heights over which the front and rear ends of the heads 16 may be adjusted by the use of the hydraulic cylinders 154 and 156 need only approximate one-half of the spaced vertical interval between adjacent holes 140 in the hangers 136.

It is obvious from the pivot arrangements of hangers 136 and 138 at pivots 134 that each of the heads 16 is independently swingable in a sideways direction. This swinging feature of the heads is discussed in greater detail hereafter. However, it can now be noted that although each of the heads 16 is independently elevatable using hangers 136 (and 138), and independently laterally swingable because of the pivoted arrangement of the hangers in pivots 134, the heads 16 operate in pairs as discussed hereafter, and therefore the heads would normally all be adjusted to the same heights at their respective front and rear ends at any one time. Additionally, it is noted that all of the front ends or all of the rear ends of the heads can be adjusted over a limited range of height due to the action of the hydraulic cylinders 154 and 156, i.e., the tilting arrangement for the heads 16. FIG. 6 thereby illustrates the swinging, tilting and elevating features of the priming heads 16; and no details of the drive for the knives or leaf orienting apparatus are shown in FIG. 6 since those details are immaterial and independent of the swinging, tilting, or elevating features of the heads 16. It should, however, be noted that any swinging of any of the heads 16 may be accommodated by the drive rods 52 and the universal driving attachments therewith; and changes of elevation of the heads 16 can be accommodated by the drive rods 52 due to the telescoping of the outer portion of the drive rods 52 over the inner portion 52a, as illustrated in FIG. 3.

Figure 9:
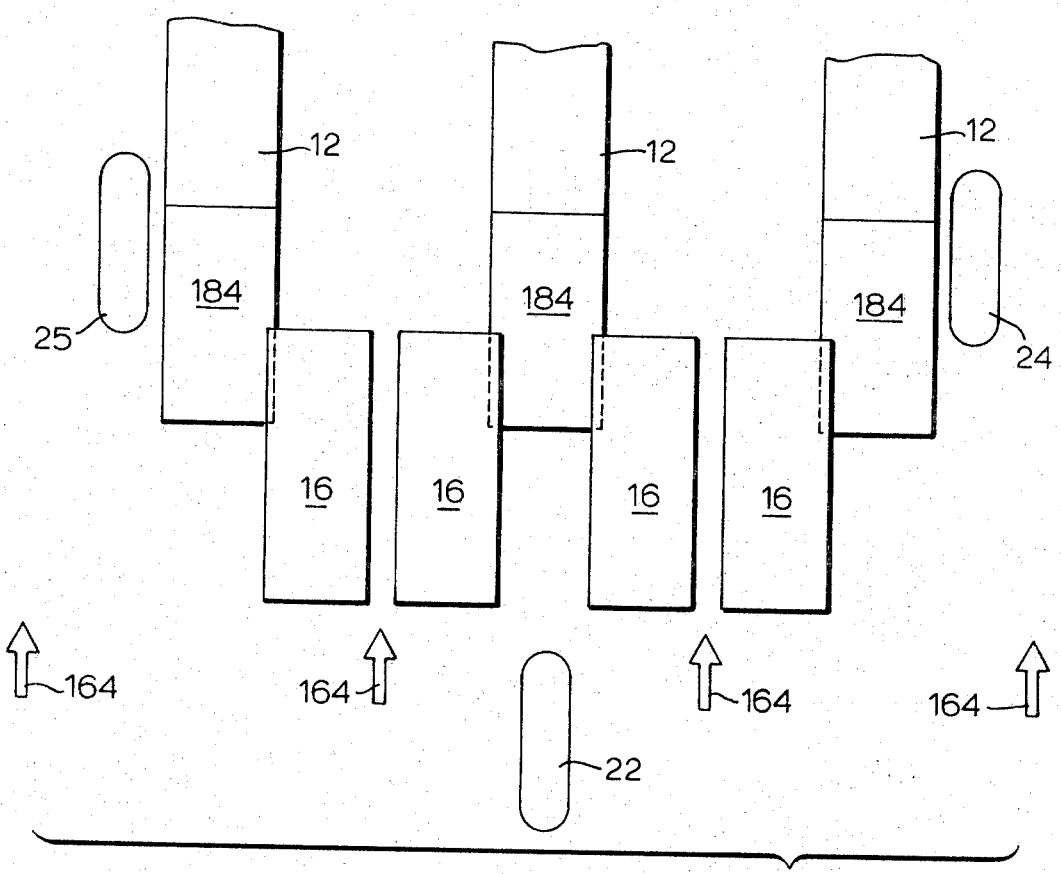
FIG. 9 is a plan schematic view showing the relationship of the leaf priming apparatus and the leaf conveying apparatus to the wheels of the tobacco harvesting vehicle, and their relationship to rows of tobacco.

The broad arrows 164 drawn in FIGS. 3 and 9 are each shown in the approximate relative position of a row of tobacco plants as they would be with respect to the tobacco priming apparatus of this invention as the tobacco harvesting machine moves along the rows of tobacco. Also, the broad arrows 164 indicate the direction of relative motion of the rows of tobacco plants with respect to the tobacco priming apparatus; i.e. the tobacco plants move, relatively, into the tobacco priming apparatus. Rows of tobacco plants may very often be planted approximately 42 inches apart, and FIG. 9 shows the relative position of four rows of tobacco plants to the tobacco priming apparatus of this invention when in its operative position in a field of tobacco. However, each plant or stalk of the plant in a row of tobacco plants may not be exactly in line with the plants adjacent to it, in either direction, and some allowance must be made in the tobacco priming apparatus to accommodate the non-linearity of any of the rows of tobacco plants. In the present tobacco priming apparatus, the non-linearity of any of the rows of tobacco is easily accommodated by the independent, lateral swinging action of any of the heads 16, as discussed above. Also, of course, it should be noted that the stalks of tobacco plants are somewhat pliant so that they may bend slightly without damage either to the plant or to the leaf thereon.

It may also be noted that each of the heads 16 may be fixed so as to have no lateral swinging action. In that event, the heads 16 may be spaced sufficiently far apart — and the length of each of the knives 86 adjusted accordingly — so as to accommodate any non-linearity that may occur among the tobacco plants in a row thereof.

Figure 10:
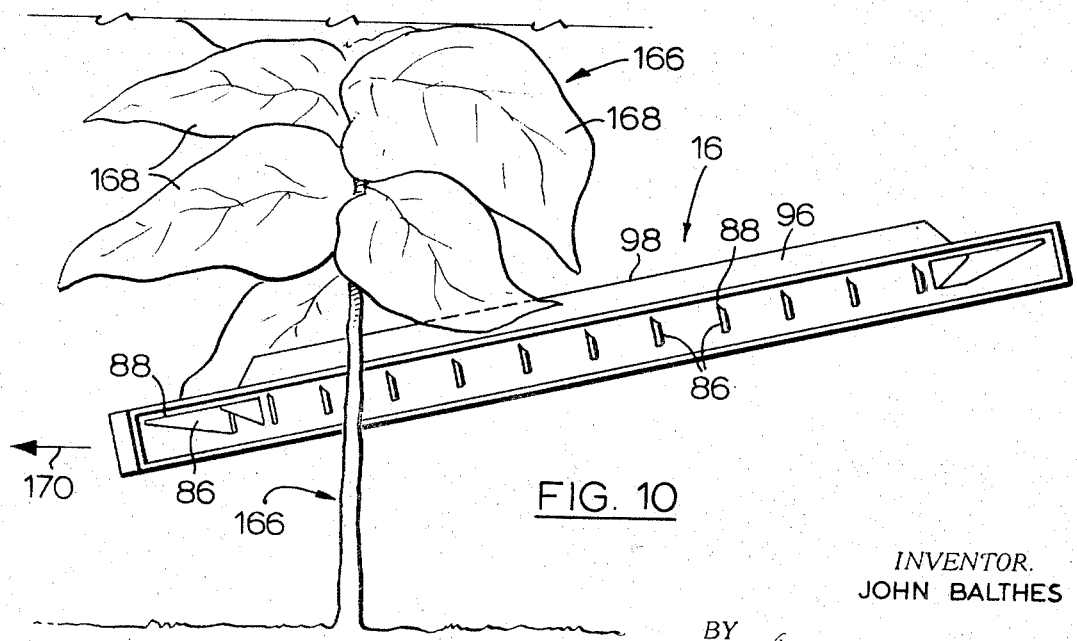
FIG. 10 is a partial side view showing the relationship of a tobacco priming head to a tobacco plant.

FIG. 10 shows the relative position of a head 16 to a tobacco plant 166 and the leaves 168 thereon, during a tobacco priming operation of the tobacco priming apparatus of this invention as it passes along a row of tobacco plants 166. The direction of travel of the heads 16 is indicated at arrow 170 so that the lower end of the head 16 is the front end, as is also evident in others of the Figures including FIGS. 2, 3 and 6. It will be noted that the stalk of each tobacco plant 166 enters the gap between a pair of heads 16 (as illustrated in FIGS. 3 and 9), and that the stalk of the tobacco plant 166 is contained in a sideways direction between the pair of heads 16 by the heads themselves. Also, the stalk of the tobacco plant 166 is contained in a front to rear direction between two adjacent knives 86. (It should be noted that the spacing of knives 86 is sufficient to easily accommodate the stalk of a tobacco plant between any two adjacent knives; and further that the tip 92 formed at the end of each of the knives 86 is sufficiently blunt so that in the rare circumstance that the end of any one of the knifes 86 directly strikes the side of the stalk of the tobacco plant, no damage to the plant will be caused, and the bluntness of the tip 92 combined with the pliance of the stalk of the tobacco plant 166 will effectively force the plant either forwards or backwards slightly so that it will then become contained, in a front to rear direction, between a pair of knives 86. The leading ends of each of the inside edges of the heads 16 may conveniently be cured, as at 171, so as to assist in feeding a stalk of a tobacco plant into the space between the heads in the event that the head strikes the stalk at that curved portion 171.)

The pads 84 act as guide pads. There may be many more pads 84 than knives 86, so that any pad may act as a guiding pad for a knife in the event that its tip 92 contacts the pad; or the pad may act to assist the holding of the stalk of a tobacco plant by contacting the surface thereof.

By suitable gearing of the drive arrangements, as discussed in greater detail hereafter, the rate at which the knives 86 move backwards in the head 16 can be set to approximate the rate at which the head 16 is moving forwards. In those circumstances where the tilt of head 16 is considerably more acute than as illustrated in FIG. 10, the rate at which the knives 86 move backwards can further be adjusted so that the rate may be horizontally resolved to approximate the rate of forward motion of the head 16. In any event, the net relative motion between the stalk of tobacco plant 166 and either of the knives 86 between which it is situated, is substantially zero. That is, the pair of heads 16 between which the knives 86 are projecting may be said to have nil relative horizontal motion with respect to the stalk of a tobacco plant situated therebetween as the pair of heads 16 moves past that tobacco plant.

It becomes obvious that a stripping action of some of the leaves from the stalk of tobacco plant 166 will be made, because while there is no relative horizontal motion between the stalk of the tobacco plant 166 and the heads 16, there is a vertical upwards motion of the knives 86 and 96 — and the knife edges 88 and 98 — relative to the stalk of the tobacco plant 166. The spacing between any pair of knife edges 88 and between the knife edges 98 is chosen so that the substantially vertically standing stalk of the tobacco plant 166 will remain uncut by the knife edges as they move upwards, but any leaf growing outwardly therefrom within the range of height over which the knife edges will move upwards will be cut from the stalk. Each leaf is cut sufficiently close to the stalk of the tobacco plant so as to effectively prime — i.e., pick or remove — the leaf from the plant and therefore to acquire a good quality leaf in good, unbroken or uninjured condition.

It has been stated that the leaves of a tobacco plant grow randomly, outwardly from the stalk thereof. It should also be noted that only one leaf grows from the stalk of a tobacco plant at any one specific height. It will now be noted that, irrespective of the direction in which a leaf grows outwardly from the stalk of a tobacco plant, where its height is within the range of heights over which the heads will move vertically relative to the stalk of the tobacco plant, the leaf will be cut by either one of the knife edges 88 or 98, or in some circumstances, by both. It is also noted that the leaf will be in good condition when it is cut from the stalk of the tobacco plant. However, it is necessary, once a leaf 168 has been cut from the stalk of the tobacco plant 166, to dispose of the leaf in a manner so as to maintain its good quality condition; preferably into a bin such as bin 18 from which all the leaves therein can conveniently be sewn in hands onto sticks for flue-curing, in the known manner. To facilitate the handling of each leaf 168 as it is primed from its respective tobacco plant 166, leaf orienting, conveying and delivery apparatus is also provided with the tobacco priming machine of this invention.

The randomness of direction in which any of the leaves may lie as it is cut from its tobacco plant stalk is at least partially overcome in the subsequent manipulating thereof by the leaf orienting apparatus which comprises the flexible finger-like paddles 44, the augur-type paddles 76 and the fan-type paddles 82. Also, each of the paddles 44, 76 and 82 is useful in providing the beginning impetus to the conveying of each leaf to one of the bins 18. Thus, when each of the heads 16 moves underneath a leaf 168 of a tobacco plant, and while the head 16 is moving past the stalk 166 of that plant, the underside of the leaf is picked up on table 42. It has been stated that the flexible finger-like paddles 44 sweep backwards along the table 42 on the inner portions of each as illustrated in FIG. 3 at a rate which is substantially equal to the rate at which the knives 86 move backwards in the space between the adjacent pairs of heads 16. Thus, there may be substantially nil relative motion between any one of the paddles 44 and a tobacco leaf 168 lying over it as the tobacco leaf moves to the rear of the respective head 16. Any tobacco leaf which is cut, and which therefore becomes free from its respective tobacco plant stalk, will be picked up on its underside by at least one of the paddles 44. It should be noted that the paddles 44 project higher from the table 42 than does the knife edge 98 at the edge thereof; and in a preferred embodiment, the leading or forward portion of the knife edge 98 is higher from the table 42 than the rear portion at the rear end of the table 42 and of the respective head 16. Thus, any tobacco leaf 168 which is overlying the head, or heads, 16 will be supported above the head, or heads, by one or several of the finger-like paddles 44; and the cut leaf will be then untouched by the knife edge 98 of either knife 96 on the pair of heads 16.

As the tobacco leaf is brought to the rear of the head — relatively speaking — it may tend to fall downwardly over the rear end of either or both of the heads 16. Augur-type paddles 76 revolve, each in the direction shown by arrows 172, so that a leaf coming into contact with one of the augur-type paddles 76 will be moved in the direction indicated by that respective paddle. Even where a leaf may be supported by several paddles 44 above both of the heads 16 of the pair, one of the augur-type paddles 76 will have a greater effect on that leaf than the other, and the leaf will be moved in the respective direction of that paddle. The tobacco leaf is then reoriented towards the outside of one or the other of heads 16, and in the event that it is bulky or awkwardly projecting in one way or another, the fan-type paddles 82 will redirect the leaf in a direction of travel parallel to the direction of travel of the arrows 46 as illustrated in FIG. 3. The direction of rotation of each of the fan-type paddles 82 is as illustrated in FIG. 3, and is shown by arrows 174.

The head 16, in association with the leaf orienting apparatus comprising paddles 44, 76 and 82, will feed tobacco leaves as they are cut to either of the tobacco conveying apparatuses 12 associated with any co-operative pair of tobacco priming heads 16; and the leaves will be fed to that apparatus one after another, that is, seriatim.

Figures 7, 8:
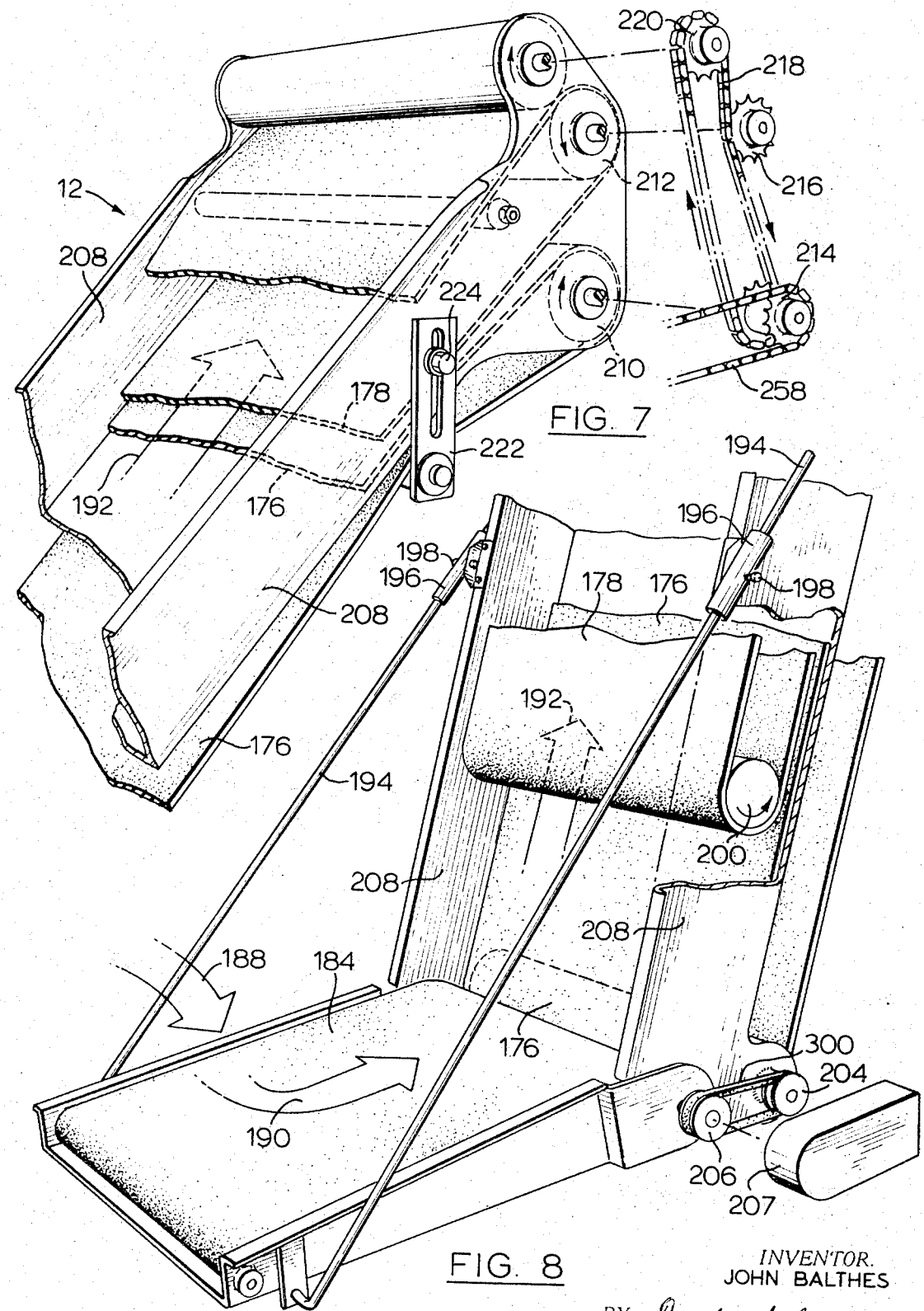
FIG. 7 is a partial perspective, exploded view showing the drive arrangement for the leaf conveying apparatus.
FIG. 8 is a partial perspective, exploded view showing the lower end arrangement of the leaf conveying apparatus.

The upper and lower ends of the leaf conveying apparatus 12 are shown in greater detail in FIGS. 7 and 8 respectively. From FIGS. 3 and 9, it will be noted that there is a leaf conveying apparatus on the outside of each of a pair of co-operating tobacco priming heads 16; and it will be seen in FIG. 9 that the tobacco conveying apparatus 12 in the center of the machine serves as the associated conveying apparatus for two heads 16, one each from the two sets of co-operating heads as discussed and illustrated herein.

The leaf conveying apparatus 12 essentially comprises a first endless belt 176 and an overlying, second endless belt 178. The direction of travel, that is the delivery direction, of belt 176 is as illustrated in FIG. 3 at arrow 180; and the delivery direction of belt 178 is obviously the return direction of the belt as it travels in the direction illustrated in FIG. 3 at arrow 182. The leaf conveying apparatus will usually also comprise a lower, receptor belt 184 whose direction of travel is as indicated at arrow 186 in FIG. 3. The material of belts 176, 178 and 184 may be any convenient, suitable flexible conveyor belt material which can be joined so as to form an endless belt in the manner discussed. A web-supported, soft rubberlike material having compressible domes formed in the upper side thereof has been found particularly useful as the material of the endless belts in the conveyor apparatus. The paths of travel of the belts 176, 178 and 182 are determined by rollers 202, 203 and 210; 200, 205 and 212; and 209 and 211, respectively.

The arrows 188, 190 and 192 shown in FIG. 8, and FIG. 7, may be regarded as sequentially showing the travel of any one tobacco leaf along the leaf conveyor apparatus; or, alternatively, the arrows may be regarded as indicating the flow of leaves as they are fed, seriatim, along the leaf conveyor apparatus.

It will thus be noted that a leaf may, under the influence of either or both of paddles 76 and 82, follow the direction of arrow 188 so that it impinges upon the receptor belt 184, whence it follows the direction of arrow 190 and 192 onto belt 176. It will be noted that belt 178 substantially overlies belt 176, but that it is shorter than belt 176. Thus, a leaf impinging upon belt 176 will travel the short distance in which that belt is uncovered by belt 178 before it enters the delivery region between the conveyor belts 176 and 178.

It will be noted that the elevation of the front end of belt 184 may be adjusted through the use of rods 194 and sleeves 196 having set screws 198 therein which co-operate with the rods 194. Thus, when the elevation of the rear end of any of the heads 16 is increased, it may be necessary to raise the elevation of the front end of belt 184 so as to preclude damage to the leaves falling thereon; and it becomes clear that the adjustment in elevation of belt 184 can easily be accomplished.

A roller 200 is inserted at the tail end of belt 178, and the roller 200 is unsecured so that it may change its relationship, that is its distance, from the upper or delivery side of belt 176. The spacing between the delivery side of belts 176 and 178 is therefore adjustable as the need may arise, and the adjustment is accommodated simply by the free floating nature of the roller 200 in belt 178. Of course, the roller 200 has sufficient mass to keep the belt 178 reasonably in tension. The lower end of belt 176 wraps around drum 202, and the drum 202 is drivingly attached to a pulley 204 which in turn drives pulley 206 through drive belt 300 so as to provide the driving arrangement to belt 184. Shields 208 may be installed at the edge of each of overlying belts 178 and 176; and a cowl 207 may be installed over pulleys 204 and 206, and drive belt 300.

Figure 11:
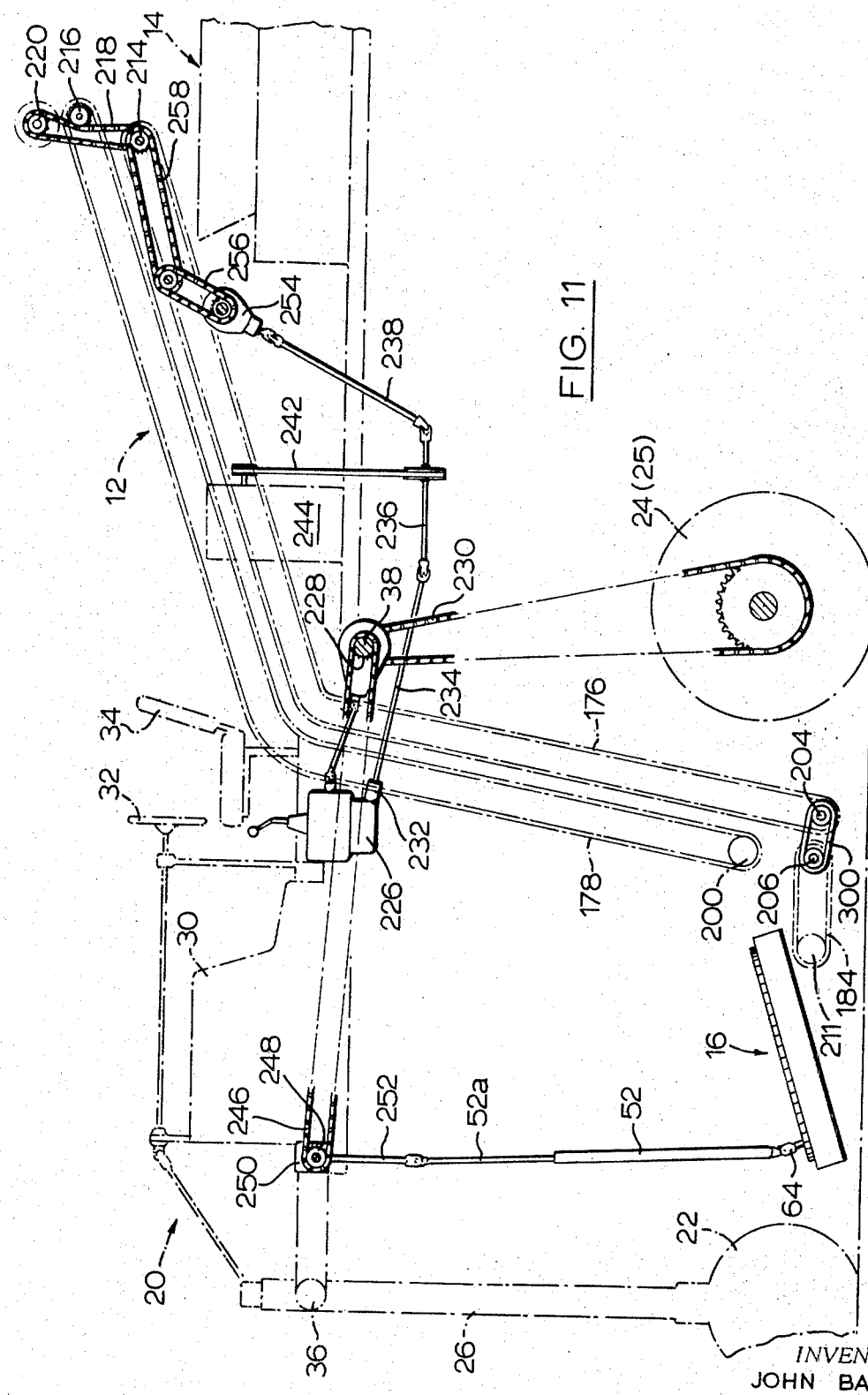
FIG. 11 is a partial schematic side view showing the drive arrangement from the tobacco harvester vehicle to the leaf priming and conveying apparatus installed therein.

The mechanical drive arrangement of the various integers of the tobacco priming apparatus of this invention is shown in FIG. 11, but it will be noted from FIG. 7 that the belts 176 and 178 are driven from rollers 210 and 212 respectively. Those rollers are, in turn, driven from pinions 214 and 216, which drive from chain 218 and tail-gear 220 so as to provide the necessary direction or rotation to drum 212. A tensioning arrangement is provided on the lower belt 176, including plates 222 secured to bolts 224 to the side frames 208.

FIG. 11 shows the manner in which power is derived from the power source of the tobacco harvester machine, i.e., engine 30. There is a transmission 226 which is a constituent part of the tobacco harvester machine; and in the particular harvester machine depicted, a drive is derived therefrom to pinion 228 and driving chains 230 which, in turn, drive rear wheels 24 and 25. Another power takeoff 232 is derived from the transmission 226, and that power takeoff drives driving rods 234, 236 and 238, and drive pulley 240 and belt 242 which, in turn, drives blower 244, discussed hereafter. It will also be noted that a further gearing is associated with pinion 228 and rear frame member 38 of the tobacco harvester machine, which further gearing drives chain 246 and pinion 248 of gear box 250 to rod 252, and thence to drive rods 52(a) and 52 which are associated with each of the tobacco priming heads 16 as discussed above. It will also be noted that drive rod 238 is associated with suitable gear box 254 and chains 256 and 258 to drive pinion 214, from which the driving force for belts 176 and 178 is derived. The drive force for belt 184 is derived from driving belt 211 wrapped around pulleys 204 and 206, as discussed above.

It will be seen that there is direct driving relationship between rod 52 on each of the priming heads 16 and driving chain 230 on the rear wheels 24 and 25. That relationship is, of course, dependent upon the gearing in gear box 250; but nevertheless, all of the gearing ratios and gear wheel sizes etc., may be chosen so that the drive delivered through drive rod 52 to each of the heads 16 is such that the driving rate of any of the knives 86 or pads 84 in the heads 16 is related to the forward speed of the heads 16 with the tobacco harvester machine; so that, as discussed above, the relative motion between any tobacco plant stalk situated within the space between a pair of co-operating heads 16, and one of the knives moving within that space between the co-operating heads, is substantially zero.

Figure 12:
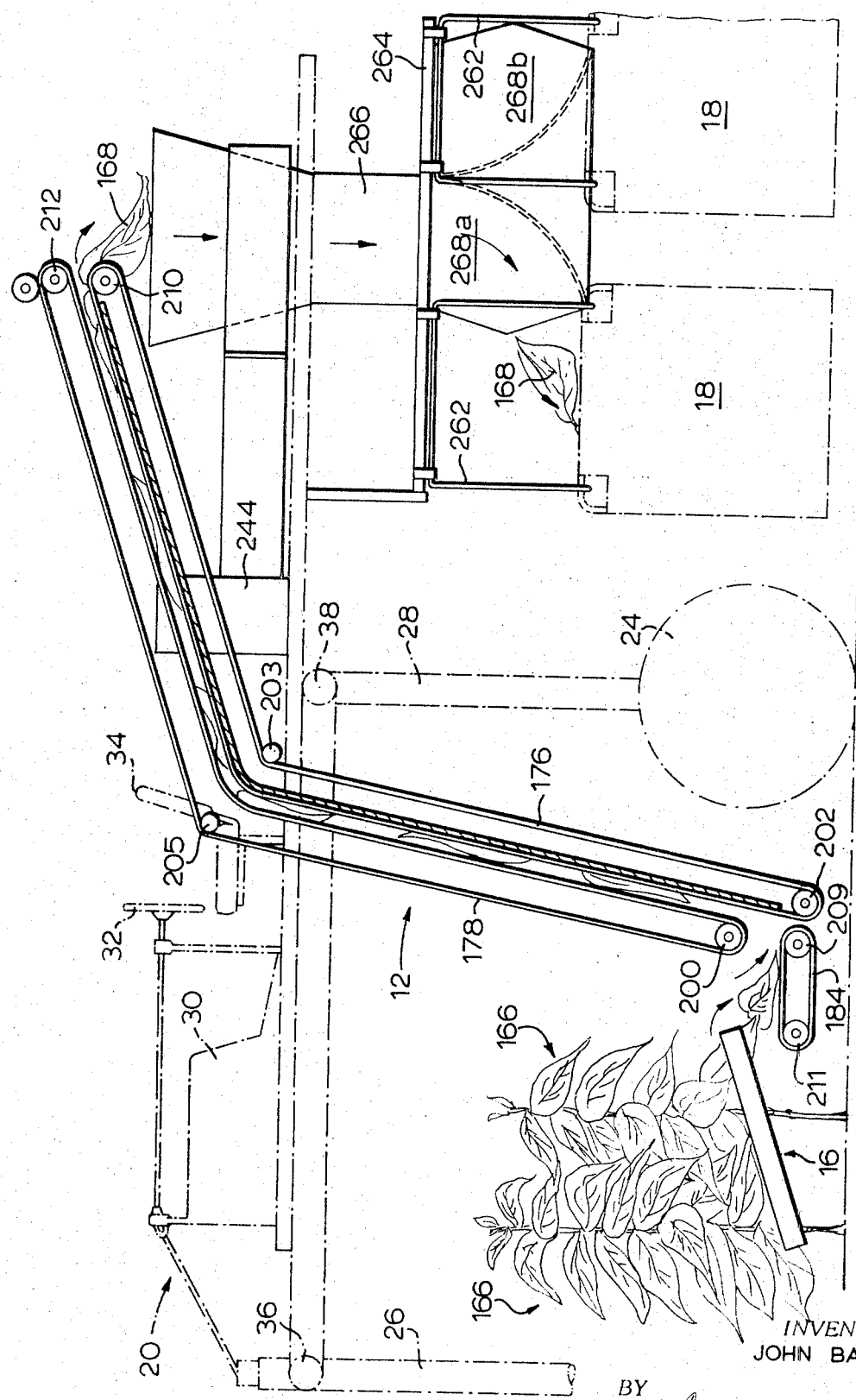
FIG. 12 is a partial schematic side view showing the relationship of the leaf conveying and delivery apparatus and the tobacco bins to tobacco plants and to the tobacco harvesting vehicle.

FIG. 12 shows the leaf conveying apparatus 12 comprising endless belts 176, 178 and 184 and their relationship to the tobacco harvester machine and to the delivery apparatus 14 and bins 18. It will be noted that a plurality of leaves 168 is shown as being in the delivery region between belts 176 and 178, and it will be noted that those leaves 168 are delivered, seriatim, to a hopper 260. Tobacco plants 166 are shown in relationship to the primer heads 16, and it is noted that the leaves beneath the primer heads 16 have been removed from the stalks of the rearmost of the tobacco plant 166.

Figure 13:
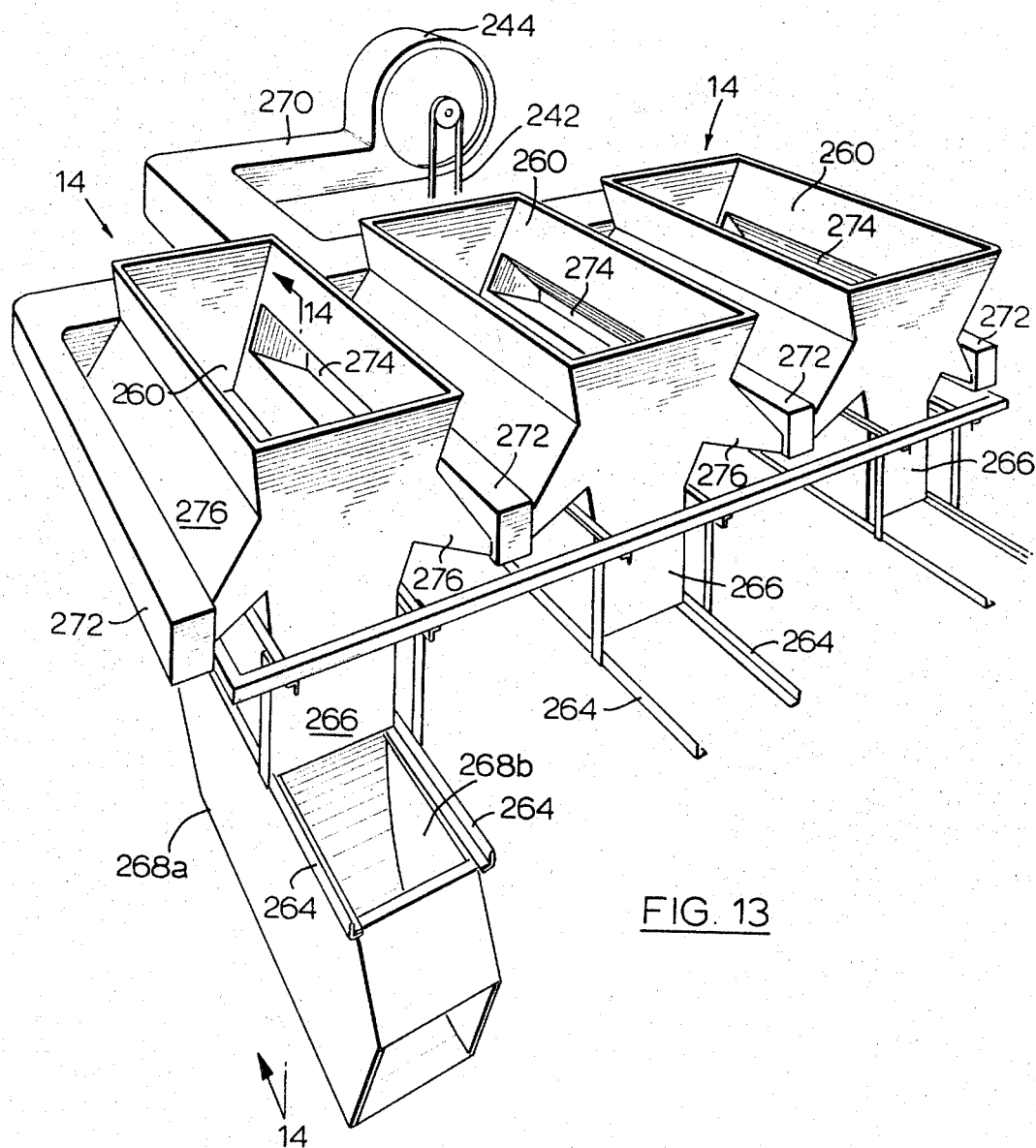
FIG. 13 is a perspective view showing the pneumatic, leaf delivery apparatus.

The bins 18 are slung on convenient hangers 262 which are mounted on rails 264. A chute 266 is situated beneath each hopper 260, and in the embodiment illustrated the chute 266 connects to a double chute 268(a), 268(b) which is slidably mounted on rails 264. It is shown in FIG. 13 that at least the left-hand most double chute is situated so that chute 268(a) communicates with chute 266, so that a leaf falling through chute 266 would be conveyed to the foremost bin 18.

The leaf delivery apparatus 14 has a pneumatic feature for which the blower 244 is provided. Blower 244 provides forced air to header 270 from which the forced air is distributed, under pressure, to manifolds 272. Air is blown from manifolds 272 through openings 274 in the sides of each of the hoppers 260, to which openings the manifolds are communicated through delivery vents 276. The openings 274 in the sides of hoppers 260 may comprise a series of perforations or slots, or otherwise, provided that sufficient air is blown upwards into the hoppers 260 as discussed hereafter.

Figure 14:
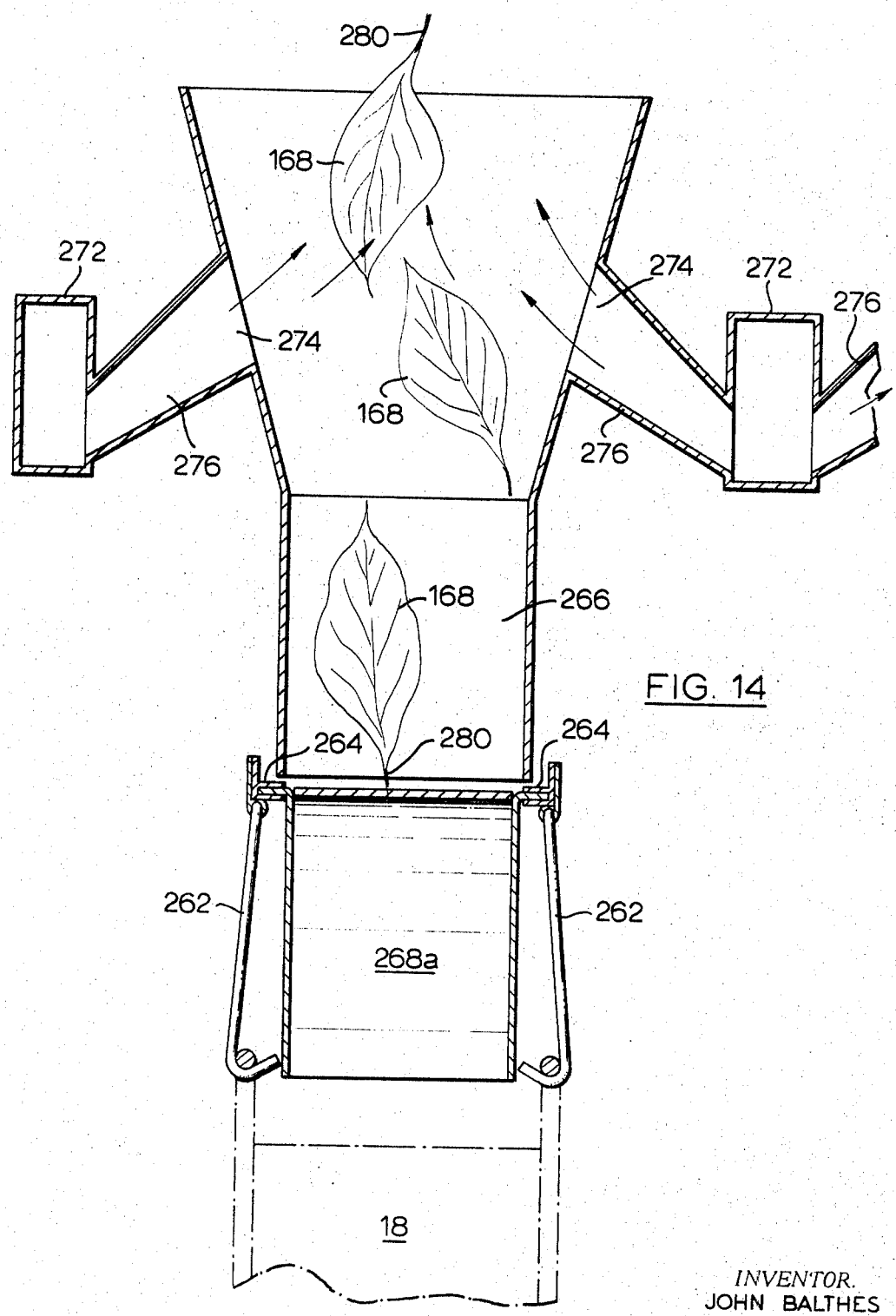
FIG. 14 is a cross sectional view of the leaf delivery apparatus looking in the direction of line 14—14 in FIG. 13.

It will be noted that the exit end of the leaf delivery apparatus 12, indicated at 278 in FIG. 12, is above the mouth of each associated hopper 260. As each leaf 168 is delivered from the exit end 278 of the leaf conveyor apparatus 12, it begins to fall freely therefrom into hopper 260. However, the pressurized air blowing upwards into the hopper 260 through openings 274 encounters the leaf which, because of its broadness of width and relative light weight, may tend to flutter or "float" in the blast or stream of pressurized air. Thus, the free fall of the leaf 168 through the hopper 260 may be delayed by the air blast. Because the butt or stem-end of each leaf, indicated at 280 in FIG. 14, is heavier than the tip end of the leaf, the delay of the free fall of the leaf through hopper 260 is sufficient to permit the heavy butt-end 280 of the leaf to turn downwards so that the leaf falls through chute 266 butt-end first. Thus, each of the leaves 168 is delivered to the bins 18 with its butt-end 280 in the same orientation as all of the other leaves also delivered to the same bin.

An alternative arrangement to the sliding double butt 268(a) and 268(b) comprises a reversible conveyor belt which may be mounted in bottom of chute 266 and which has a substantially triangular path of travel when viewed from the side. The reversible conveyor belt is tipable about its lower roller (the lower apex of the triangle) and is reversible in its direction of drive so that, for example, when tipped backwards and driving in that direction it will deliver a falling leaf 168 from the lower end of chute 266 into the rearward bin 18, and vice versa. The one bin would be filled, of course, before any leaves were directed to the other bin; but the length of any given row of tobacco plants may be such that there may be a greater number of leaves primed during a single pass along that row by the automatic priming apparatus of this invention than can be accommodated in any single bin 18.

There has been described above an automatic tobacco priming machine for removing randomly, outwardly growing leaves from tobacco plants in rows. The automatic tobacco priming machine delivers the primed tobacco leaves in good condition to bins so that the leaves have a constant orientation, i.e. butt-ends all facing in one direction). It has been noted that the tobacco priming apparatus comprises a pair of co-operating heads between which the tobacco stalks are positioned during the priming operation; and that the drive speeds of the cutting knives and sweeping paddles in the co-operating heads are such that the relative motion between a specific horizontally disposed knife and the plant stalk with which it is associated is substantially zero as the tobacco harvester machine on which the tobacco priming apparatus is installed moves past that plant.

It should also be noted that the air blast 104 eminating from vent 102 is either of the heads 16 of the co-operating pair of heads derives its compressed air through duct 100 from compressor 244. When the air blast 104 is operating, it assists the priming operation by assuring that each leaf 168 of a tobacco plant is lifted over the table 42 and the sweeping paddles 44 of each of the heads 16, thereby precluding damage to the leaf and assuring that it is properly positioned to be removed away from the heads 16 and onto the leaf conveying apparatus after it is cut from the tobacco plant.

The knives 86 may have various configurations. Another configuration of the knives is a U-shaped knife, attached at each end of the legs of the U to a bracket for attachment to the drive chain 68. The knife edge formed in the U-shaped knife is formed entirely around the upper edge of the knife. Also, within the heads 16, or either of them as may be indicated, the pads 84 may be replaced with a continuous belt of resilient material to act as guides and shock mounting in the same manner as discussed above.

It is also noted that more than one co-operating set of tobacco leaf priming heads 16 may be installed on a tobacco harvester machine, such as is illustrated. The tobacco priming apparatus, and the leaf conveying and delivery apparatus may be adapted to very many agricultural vehicles; and indeed, the apparatus may be adapted to a towed vehicle provided that an arrangement is made to drive the priming heads 16 at a rate proportional to the forward speed of the vehicle. The forward speed at which the tobacco priming apparatus of this invention is moved through the tobacco field and along the rows of tobacco plants therein would be determined by the operator of the machine, and would depend on many factors including the precise degree of ripeness, the moisture content of the leaves, the size of the leaves, etc.

The swinging arrangement of the heads 16 may alternatively be provided so that each of hangers 136 and 138 hangs independently from pivots 134 which are mounted beneath any one of the support members for each pair of hangers. When the pivots are fixed beneath the support, and link arm 142 is pivotally mounted between the hangers, a pentagraphic, lateral movement of the hangers is assured when any of the heads swing sideways so that each head is maintained in a horizontal orientation during any lateral swinging movement thereof.

Automatic steering apparatus, usually of a wand type which is very well known in the tobacco growing art, may be attached to the tobacco harvester machine on which the tobacco priming apparatus of this invention is mounted. In that case, the automatic priming apparatus discussed above may function without an operator, assuming a suitable constant speed throttle setting, other than for someone to turn the machine in the headlands at the ends of the rows of tobacco plants in the field; and someone to offload the filled tobacco bins and to reload empty tobacco bins for the next run.

It is also clear that the height at which the tobacco priming heads operate above the ground may be very easily and readily adjusted to suit the priming conditions as they exist at any time. Finally, it is noted that each tobacco leaf may be removed, i.e., primed, from its respective tobacco plant cleanly and without damage or injury to the leaf; and that the leaf can be oriented, conveyed and delivered to bins from whence it can be sewn to a stick for curing, all without damage, and all without the expense of manual labor.

The priming machine of this invention may also be adapted for removing product from other, row-crop, plants; e.g., ears of corn.

The embodiments of the invention in which an exclusive property or privilege is claimed are defined as follows:

1. In a machine for removing leaves from the substantially upright stalk of a plant, where the leaves grow randomly, outwardly from said stalk, the combination comprising:

a pair of elevatable tables adapted to be moved at a desired speed relative to the stalk of a plant from which leaves are to be removed, and spaced horizontally a distance so as to accommodate said stalk therebetween, and inclined upwardly from front to rear; and cutting means comprising a plurality of knives having upwardly facing knife edges adapted to project sideways from an edge of at least one of said pair of tables into the space between said pair of tables, and adapted to be moved backwardly along said at least one edge of said at least one table at a speed corresponding to the speed at which said tables are moved relative to the plant stalk; a further upwardly facing knife edge disposed along at least a portion of the side of each one of said pair of tables adjacent to the space therebetween; and a plurality of flexible, paddles adapted to sweep backwardly on the upper surface of each one of said pair of tables.

2. The combination of claim 1 where each of said pair of spaced tables is adapted to swing laterally, independently of the other of said pair.

3. The combination of claim 2 further comprising:
a flexible, augur-type paddle whose axis of rotation extends in a plant below and substantially parallel to the plane of the inner portion of the upper surface of each one of said pair of tables, respectively, and disposed so as to extend rearwardly from the rear edge of each one of said pair of tables, respectively; and
a flexible, fan-type paddle disposed with its axis of rotation to the outside of each one of said pair of tables, respectively, and substantially perpendicular thereto.

4. The combination of claim 3 further comprising:
air blast means adapted to blow air upwardly and towards the space between said pair of tables;
said air blast means being disposed near the inner, front edge of at least one of said pair of tables.

5. Leaf orientation apparatus adapted to be mounted with leaf removing apparatus so as to orient leaves which are removed from the substantially upright stalk of a plant, and which have grown randomly, outwardly from said stalk; wherein said leaf orientation apparatus is to deliver said leaves to leaf conveying equipment, comprising:
a plurality of sets of sweeping, flexible, finger-like paddles, each set comprising a plurality of said finger-like paddles being adapted to lift and move said leaves in a first direction, in which first direction said sweeping paddles are effecting their sweeping action;
a flexible, augur-type paddle associated with each set of sweeping paddles with its axis of rotation extending in said first direction below the effective plane of action of said set of sweeping paddles; and
a flexible, fan-type paddle associated with each set of sweeping paddles with its axis of rotation extending substantially vertically to and above and at the side of said effective plane of action of said set of sweeping paddles;
the direction of rotation of each said augur-type paddle being such as to tend to move any leaf touching the same to a position to the side of the effective plane of action of said set of sweeping paddles remote from said augur-type paddle and nearer said associated fan-type paddle; and
the direction of rotation of each said fan-type paddle being such as to tend to move any leaf touching the same in a direction parallel to said first direction and in an orientation at the fan-type paddle side of each of said respective set of sweeping paddles.

6. A tobacco priming machine for removing randomly outwardly growing leaves from the substantially upright stalk of a tobacco plant, said priming machine being adapted to remove leaves from tobacco plants when said tobacco plants are growing in spaced apart rows having predetermined row-spacing, said priming machine being further adapted to remove leaves from said tobacco plants at a predetermined height range measured from the ground on said plants, comprising, in combination:
at least a pair of elevatable tables adapted to be moved at a desired speed relative to the stalk of a plant from which leaves are to be removed, and spaced horizontally a distance so as to accommodate said stalk therebetween, and inclined upwardly from front to rear;
cutting means comprising a plurality of knives having upwardly facing knife edges adapted to project sideways from an edge of at least one of said pair of tables into the space between said pair of tables, and adapted to be moved backwardly along said at least one edge of said at least one table at a speed corresponding to the speed at which said tables are moved relative to the plant stalk; a further upwardly facing knife edge disposed along at least a portion of the side of each one of said pair of tables adjacent to the space therebetween; a plurality of flexible paddles adapted to sweep backwardly on the upper surface of each one of said pair of tables; and
drive means adapted to drive said plurality of sideways projecting knives backwards at a horizontally resolved, linear rate substantially equal to the rate of forward motion of the tobacco priming machine so that the net relative motion between any one of said knives and a tobacco plant stalk situated between said at least one pair of tables and proximate said one knife, is substantially zero.

7. The tobacco priming machine of claim 6, where each of said pair of spaced tables is adapted to swing laterally, independently of the other of said pair.

8. The tobacco priming machine of claim 7 further comprising:
means to provide continual adjustment of elevation of the front edges or rear edges of said at least one pair of tables over a specific range of elevation independently of any adjustment in elevation to the rear or front edges of said tables respectively.

9. The tobacco priming machine of claim 8, further comprising:
a plurality of flexible, finger-like paddles adapted to sweep backwardly on the inner portion of the upper surface of each of said pair of tables, and driven at substantially the same linear rate as that of said driven knife edges;
a flexible, augur-type paddle whose axis of rotation extends in a plane below and substantially parallel to the plane of the inner portion of the upper surface of each of said pair of tables, respectively, and disposed so as to extend rearwardly from the rear edge of each of said pair of tables, respectively; and
a flexible, fan-type paddle disposed with its axis of rotation to the outside of each of said pair of tables, respectively, and substantially perpendicular thereto.

10. The tobacco priming machine of claim 9, further comprising:
a first, driven endless belt having its delivery direction on the upper side of its path of travel;

a second, driven endless belt being driven at the same delivery speed as said first belt and in a path of travel substantially overlying and parallel to the path of travel of said first belt, but with the delivery direction of said second belt on its lower side so that the delivery directions of said first and second belts are effectively in the same direction, and so that the delivery portions of said first and second belts are facing; and hopper means for receiving said leaves seriatim from the delivery end of said first and second belts, said hopper means having an upwardly directed air blast therein adapted to encounter said leaves as each leaf enters the hopper so as to delay the free-fall of each said leaf for sufficiently long that the heavier, butt-end of said leaf falls through said hopper means and is delivered to leaf receiving bin means butt-end first;

wherein said flexible, finger-like paddles, said flexible, augur-type paddles and said flexible, fan-type paddles are adapted so that a leaf swept backwards in a first direction over the top surface of one of said tables by said finger-like paddles would be moved, on contact with the associated augur-type paddles, towards the associated fan-type paddle with said finger-like paddles and subsequently on contact with said fan-type paddle, in a direction parallel to said first direction and towards the receiving end of said first and second driven, endless belts; so that, when a plurality of leaves are removed, seriatim, from a plurality of tobacco plant stalks, said plurality of leaves are delivered, seriatim, to said receiving end of said belts.

11. The combination of claim 2 further comprising:

a flexible, augur-type paddle whose axis of rotation extends in a plane below and substantially parallel to the plane of the inner portion of the upper surface of each one of said pair of tables, respectively, and disposed so as to extend rearwardly from the rear edge of each one of said pair of tables, respectively.

12. The combination of claim 8 further comprising:

a flexible, augur-type paddle whose axis of rotation extends in a plane below and substantially parallel to the plane of the inner portion of the upper surface of each one of said pair of tables, respectively, and disposed so as to extend rearwardly from the rear edge of each one of said pair of tables, respectively.

* * * * *